United States Patent
Kim et al.

(10) Patent No.: US 9,564,631 B2
(45) Date of Patent: Feb. 7, 2017

(54) COMPOSITE ANODE ACTIVE MATERIAL, ANODE AND LITHIUM BATTERY EACH INCLUDING THE COMPOSITE ANODE ACTIVE MATERIAL, METHOD OF PREPARING THE COMPOSITE ANODE ACTIVE MATERIAL

(71) Applicant: SAMSUNG ELECTRONICS CO., LTD., Suwon-si (KR)

(72) Inventors: Sang-won Kim, Seoul (KR); Jong-jin Park, Hwaseong-si (KR); Jin-hwan Park, Seoul (KR); Hyung-wook Ha, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 272 days.

(21) Appl. No.: 14/034,891

(22) Filed: Sep. 24, 2013

(65) Prior Publication Data

US 2014/0087255 A1 Mar. 27, 2014

(30) Foreign Application Priority Data

Sep. 24, 2012 (KR) ........................ 10-2012-0105948

(51) Int. Cl.
*H01M 4/02* (2006.01)
*H01M 4/36* (2006.01)
*H01M 4/04* (2006.01)
*D01D 5/00* (2006.01)
*D01D 5/34* (2006.01)
*D01F 9/14* (2006.01)
*H01M 4/38* (2006.01)
*H01M 4/62* (2006.01)
*D01F 1/08* (2006.01)
*D01F 8/18* (2006.01)
*H01M 4/134* (2010.01)
*H01M 4/1395* (2010.01)

(52) U.S. Cl.
CPC ........... *H01M 4/366* (2013.01); *D01D 5/0007* (2013.01); *D01D 5/0069* (2013.01); *D01D 5/34* (2013.01); *D01F 1/08* (2013.01); *D01F 8/18* (2013.01); *D01F 9/14* (2013.01); *H01M 4/0411* (2013.01); *H01M 4/0471* (2013.01); *H01M 4/134* (2013.01); *H01M 4/1395* (2013.01); *H01M 4/386* (2013.01); *H01M 4/387* (2013.01); *H01M 4/625* (2013.01); *H01M 4/626* (2013.01); H01M 4/0473 (2013.01); H01M 2004/021 (2013.01); H01M 2004/022 (2013.01); Y02E 60/122 (2013.01)

(58) Field of Classification Search
CPC ...................................................... H01M 4/02
See application file for complete search history.

(56) References Cited

U.S. PATENT DOCUMENTS

2010/0173105 A1 7/2010 Tsotsis et al.

FOREIGN PATENT DOCUMENTS

| CN | 102576857 A | 7/2012 |
|---|---|---|
| JP | 2011-18575 A | 1/2011 |
| JP | 4817772 B2 | 11/2011 |
| KR | 10-0988032 B1 | 10/2010 |
| KR | 10-2011-0063388 A | 6/2011 |
| KR | 10-2011-0126055 A | 11/2011 |
| KR | 1020110133320 A | 12/2011 |
| KR | 10-2012-0063167 A | 6/2012 |
| KR | 10-2012-0066349 A | 6/2012 |
| WO | 2010-138617 A2 | 12/2010 |
| WO | 2010138617 A2 | 12/2010 |
| WO | 2011-127218 A2 | 10/2011 |

OTHER PUBLICATIONS

Hwang et al. ("Electrospun Core-Shell Fibers for Robust Silicon Nanoparticle-Based Lithium Ion Battery Anodes" ACS Nano Letters 2012, 12, 802-807).*
Toprakci et al. ("Carbon Nanotube-Loaded Electrospun LiFePO4/Carbon Composite Nanofibers as Stable and Binder-Free Cathodes for Rechargeable Lithium-Ion Batteries" ACS Appl. Mater. Interfaces 2012, 4, 1273-1280).*
Yu, et al.; "Encapsulation of Sn@carbon Nanoparticles in Bamboo-like Hollow Carbon Nanofibers as an Anode Material in Lithium-Based Batteries", Angewandte Chemie International Edition, Aug. 17, 2009, vol. 48 No. 35, pp. 6485-6489.
Yu, et al; "Tin Nanoparticles Encapsulated in Porous Multichannel Carbon Microtubes: Preparation by Single-Nozzle Electrospinning and Application as Anode Material for High-Performance Li-Based Batteries", Journal of the American Chemical Society, Nov. 11, 2009, vol. 131, No. 44, pp. 15984-15985.
Lee, et al; "Fabrication of Si Core/C Shell Nanofibers and their Electrochemical Performances as a Lithium-ion Battery Anode", Journal of Power Sources, Jan. 6, 2012, vol. 206, pp. 267-273.
Lee, et al; "Facile Conductive Bridges Formed Between Silicon Nanoparticles Inside Hollow Carbon Nanofibers", Nanoscale, Apr. 3, 2013, vol. 5, No. 11, pp. 4790-4796.
Communication dated Nov. 29, 2013, issued by the European Patent Office in counterpart European Application No. 13184997.8.
Communication dated Sep. 1, 2016, issued by the State Intellectual Property Office in counterpart Chinese Application No. 201310421255.0.
Yan Yu et al: "Encapsulation of Sn@carbon Nanoparticles in Bamboo-like Hollow Carbon Nanofibers as an Anode Material in Lithium-Based Batteries", Angewandte Chemie Int. Ed, 2009, vol. 48, pp. 6485-6489 (5 pages total).
Yan Yu et al: "Tin Nanoparticles Encapsulated in Porous Multichannel Carbon Microtubes: Preparation by Single-Nozzle Electrospinning and Application as Anode Material for High-Performance Li-Based Batteries", J. Am. Chem. Soc., 2009, vol. 131, pp. 15984-15985 (2 pages total).

* cited by examiner

*Primary Examiner* — Jacob Marks
(74) *Attorney, Agent, or Firm* — Sughrue Mion, PLLC

(57) ABSTRACT

A composite anode active material, an anode including the composite anode active material, a lithium battery including the anode, and a method of preparing the composite anode active material. The composite anode active material includes: a shell including a hollow carbon fiber; and a core disposed in a hollow of the hollow carbon fiber, wherein the core includes a first metal nanostructure and a conducting agent.

21 Claims, 10 Drawing Sheets

COMPOSITE ANODE ACTIVE MATERIAL, ANODE AND LITHIUM BATTERY EACH INCLUDING THE COMPOSITE ANODE ACTIVE MATERIAL, METHOD OF PREPARING THE COMPOSITE ANODE ACTIVE MATERIAL

CROSS-REFERENCE TO RELATED APPLICATIONS

This application claims priority from Korean Patent Application No. 10-2012-0105948, filed on Sep. 24, 2012, in the Korean Intellectual Property Office, the entire contents of which are incorporated herein by reference.

BACKGROUND

1. Field

The present disclosure relates to a composite anode active material, an anode including the composite anode active material, a lithium battery including the anode, and a method of preparing the composite anode active material.

2. Description of the Related Art

Carbonaceous materials, such as graphite, are representative examples of anode active materials suitable for use in lithium batteries. Graphite has good capacity retention and high potential characteristics, and ensures a battery's high stability because there is no volumetric change during the intercalation or deintercalation of lithium. Graphite has a theoretical electrical capacity of about 372 mAh/g and a high irreversible capacity.

In addition, metals that can form alloys with lithium may be used as an anode active material for lithium batteries. Examples of metals that can form alloys with lithium include silicon (Si), tin (Sn), aluminum (Al), and the like. These metals that can form alloys with lithium have a very high electrical capacity. For example, these metals may have an electrical capacity 10 times higher than that of graphite. Such metals undergo volume expansion or shrinkage during charging/discharging, thereby causing the active material within the electrode to become electrically isolated. In addition, the decomposition reaction of electrolytes becomes severe due to an increase in the specific surface area of the active material.

Therefore, there is a demand for a composite anode active material having an electrical capacity as high as those metals alloyable with lithium and which is capable of absorbing stress resulting from the volumetric expansion of metal to prevent the deterioration of the composite anode active material.

SUMMARY

One or more embodiments provide a composite anode material with improved capacity and improved lifetime characteristics.

One or more embodiments also provide an anode including the composite anode active material.

One or more embodiments also provide a lithium battery employing the anode.

One or more embodiments also provide a method of preparing the composite anode active material.

According to an aspect of an exemplary embodiment, there is provided a composite anode active material including: a shell including a hollow carbon fiber; and a core disposed in a hollow of the hollow carbon fiber, wherein the core includes a first metal nanostructure and a conducting agent.

According to an aspect of another exemplary embodiment, there is provided an anode including the above-defined composite anode active material.

According to an aspect of another exemplary embodiment, there is provided a lithium battery including the above-defined anode.

According to an aspect of another exemplary embodiment, there is provided a method of preparing a composite anode active material including: preparing a first solution including a pore-forming material, a first metal nanostructure, and a conducting agent; preparing a second solution including a second polymer; electrospinning the first solution and the second solution at the same time to prepare a polymer fiber comprising a core including the pore-forming material and a shell including the second polymer; stabilizing the polymer fiber; and calcining the stabilized polymer fiber to obtain the composite anode active material.

BRIEF DESCRIPTION OF THE DRAWINGS

The above and/or other aspects will become apparent and more readily appreciated from the following description of exemplary embodiments, taken in conjunction with the accompanying drawings of which.

DETAILED DESCRIPTION

Figure 1:
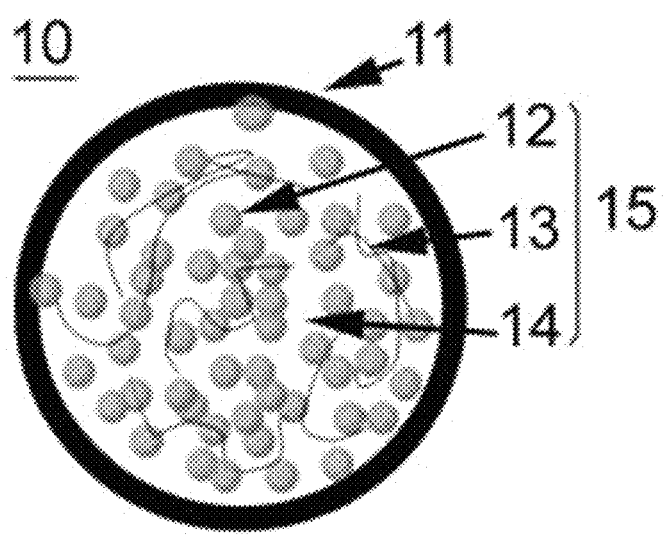
FIG. 1 is a cross-sectional view of a composite anode active material according to an embodiment.
Figure 2A:
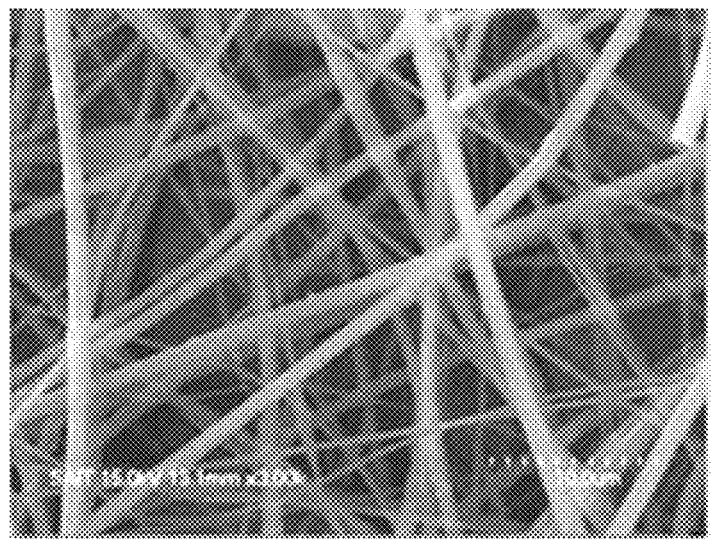
FIG. 2A is a scanning electron microscopic (SEM) image of a polymer fiber having a core/shell structure in Example 1.
Figure 2B:
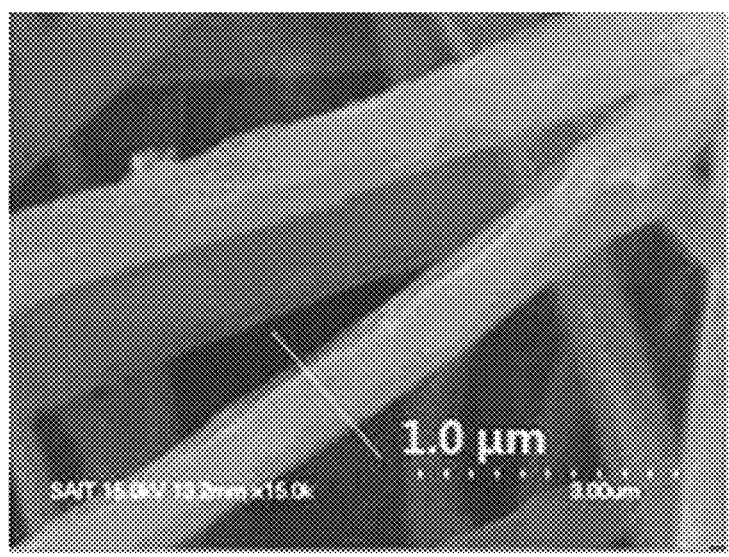
FIG. 2B is a magnified view of FIG. 2A.

Reference will now be made in detail to exemplary embodiments including a composite anode active material, an anode including the composite anode active material, a lithium battery using the anode, and a method of preparing the composite anode active material, examples of which are illustrated in the accompanying drawings, wherein like reference numerals refer to like elements throughout. In this regard, the present embodiments may have different forms and should not be construed as being limited to the descriptions set forth herein. Accordingly, the embodiments are described below are merely descriptive in nature and used to explain aspects of the present description by reference to the figures. As used herein, the term "and/or" includes any and all combinations of one or more of the associated listed items. Expressions such as "at least one of," when preceding a list of elements, modify the entire list of elements and do not modify the individual elements of the list.

According to an embodiment, a composite anode active material includes: a shell including a hollow carbon fiber; and a core disposed in a hollow of the hollow carbon fiber, the core including a first metal nanostructure and a conducting agent. A first metal in the first metal nanostructure is a metal alloyable with lithium.

Referring to FIG. 1, a composite anode active material 10 according to an embodiment includes a shell 11 of a hollow carbon fiber, and a core 15 disposed in a hollow of the shell 11, the core 15 includes a first metal nanostructure 12 and a conducting agent 13.

As a result of including a first metal nanostructure alloyable with lithium, the composite anode active material may exhibit improved discharge capacity. The conducting agent of the composite anode active material electrically connects adjacent first metal nanostructures, and electrically connects the hollow carbon fiber and a first metal nanostructure, and thus may improve the conductivity, charge/discharge efficiency, and high-rate characteristics of the composite anode active material. The shell of the hollow carbon fiber may accommodate sharp volumetric changes in the first metal nanostructure during charging and discharging and thereby prevent deterioration of the first metal nanostructure, and consequentially improve lifetime characteristics. The conducting agent may prevent the agglomeration of the first metal nanostructures from deteriorating.

The core of the composite anode active material may include a pore. The core may be porous. For example, the core of the composite anode active material may include at least one pore between the first metal nanostructure and the conducting agent. Due to the inclusion of pores, the core may effectively accommodate volumetric changes in the first metal nanostructure during charging and discharging. Referring to FIG. 1, the core 15 also comprises a pore 14. The pores are preferably open but may be closed.

The core may have a porosity of from about 1% to about 80%. That is, an inner region of the shell of hollow carbon fiber, i.e., a hollow region, corresponds to the core. The core may have a pore volume of from about 1% to about 70% of the total volume of the core, with the pore volume not including the volume of the first metal nanostructure and the conducting agent in the core. For example, the core may have a porosity of from about 10% to about 60%, but is not limited thereto. The porosity of the core may be appropriately controlled within a certain range to further improve the discharge capacity, high-rate characteristics, and lifetime characteristics of a lithium battery.

The pore area in a short-axial cross-section of the composite anode active material may be from about 10% to about 90% of the total area of the short-axial cross-section. The short-axial cross-section is perpendicular to the length direction of the fibrous composite anode active material. For example, the composite anode active material may have a pore area of from about 30% to about 60%. The pore area of the composite anode active material may be calculated using a scanning electron microscopic image of the short-axial cross-section thereof.

The hollow carbon fiber of the composite anode active material may have an outer diameter of about 500 nm or greater, and in some embodiments, from about 500 nm to about 5 µm, and in some other embodiments, from about 500 nm to about 3 µm, and in still other embodiments, from about 500 nm to about 1.5 µm, but is not limited thereto. The outer diameter of the hollow carbon fiber may be appropriately controlled within a range so as to provide improved discharge capacity, improved high-rate characteristics, and improved lifetime characteristics for a lithium battery.

The hollow carbon fiber of the composite anode active material may have a wall thickness of from about 50 nm to about 500 nm, and in some embodiments, from about 50 nm to about 500 nm, and in some other embodiments, from about 50 nm to about 300 nm, but is not limited thereto. The wall thickness of the hollow carbon fiber may be appropriately controlled within a range so as to further improve the discharge capacity, high-rate characteristics, and life-time characteristics of a lithium battery.

The first metal of the composite anode active material may include at least one element selected from the group consisting of the elements of Groups 13, 14, and 15 of the periodic table of the elements. The "first metal" refers to an element alloyable with lithium and that may be classified as a metal and/or a semi-metal in the periodic table of elements, wherein carbon and metals not able to form an alloy with lithium are excluded. In some embodiments, the first metal may include an element selected from the group consisting of aluminum (Al), gallium (Ga), indium (In), thallium (Tl), silicon (Si), germanium (Ge), tin (Sn), lead (Pb), antimony (Sb), bismuth (Bi), and combinations thereof.

For example, the first metal in the composite anode active material may include at least one element selected from the group consisting of Si, Ge, and Sn. The first metal may preferably be Si.

The nanostructure in the composite anode active material may be formed so as to be at least one selected from the group consisting of nanoparticle, nanorod, nanowire, nanotube, nanobelt, nanoporous, nanocapsule, and nanotube, but is not limited thereto. The nanostructure may have any of a variety of structures on a nanoscale. For example, the nanostructure may be a nanoparticle.

The nanoparticle of the composite anode active material may have an average particle diameter of from about 25 nm to about 75 nm, and in some embodiments, from about 25 nm to about 75 nm, and in some other embodiments, from about 40 nm to about 60 nm, but is not limited thereto. The average particle diameter of the nanoparticle may be appropriately controlled within a range so as to further improve the discharge capacity, high-rate characteristics, and lifetime characteristics of a lithium battery.

In some embodiments, the conducting agent in the composite anode active material may be at least one selected from the group consisting of a carbon nanostructure and a second metal nanostructure.

The carbon nanostructure may be at least one selected from the group consisting of carbon nanotube, graphene, carbon nanofiber, fullerene, active carbon particle, carbon nanoplate, carbon onion, and carbon nanoporous, but is not limited thereto. Any of a variety of conducting agents available in the art may be used. For example, the carbon nanotube may be a single-walled carbon nanotube, a double-walled carbon nanotube, or a multi-walled carbon nanotube. In some embodiments, the carbon nanotube may be a metallic carbon nanotube or a semiconductive carbon nanotube.

The second metal nanostructure may have the same nanostructure as the first metal nanostructure described above and include a second metal. The second metal takes on a role of a conducting agent. In general, the second metal is not alloyable with lithium. The second metal may include at least metal selected from the group consisting of silver (Ag), gold (Au), copper (Cu), aluminum (Al), calcium (Ca), tungsten (W), zinc (Zn), nickel (Ni), lithium (Li), iron (Fe), platinum (Pt), and titanium (Ti), but is not limited thereto. Any of a variety of metals that are not alloyable with lithium and available as a conducting agent may be used as the second metal.

The first metal nanostructure and the conducting agent in the core of the composite anode active material may be in a weight ratio of from about 95:5 to about 75:25, but are not limited thereto. The weight ratio of the first metal nanostructure and the conducting agent may be appropriately controlled within a range so as to further improve the discharge capacity, high-rate characteristics, and lifetime characteristics of a lithium battery.

According to another embodiment, an anode includes the above-described composite anode active material. For example, the anode may be manufactured by molding an anode active material composition including the composite anode active material and a binder into a desired shape, by coating the anode active material composition onto a current collector such as a copper foil, or the like.

In particular, the composite anode active material, a conducting agent, a binder, and a solvent may be mixed to prepare the anode active material composition. The anode active material composition may be directly coated on a metallic current collector to prepare an anode plate. Alternatively, the anode active material composition may be cast on a separate support to form an anode active material film, which may then be separated from the support and laminated on a metallic current collector to prepare an anode plate. However, the anode is not limited to the examples described above, and may be one of a variety of types.

In some embodiments, the anode active material composition may further include another carbonaceous anode active material, in addition to the composite anode active material. For example, the carbonaceous anode active material may include at least one selected from the group consisting of natural graphite, artificial graphite, expandable graphite, graphene, carbon black, fullerene soot, carbon nanotubes, and carbon fiber, but is not limited thereto, and may be any carbonaceous substrate available in the art.

Non-limiting examples of the conducting agent are acetylene black, ketjen black, natural graphite, artificial graphite, carbon black, carbon fiber, and metal powder and metal fiber of, for example, copper, nickel, aluminum, or silver. In some embodiments at least one conducting material, such as a polyphenylene derivative, may be used in combination. Any conducting agent available in the art may be used. The above-described crystalline carbonaceous materials may also be added as the conducting agent.

Examples of the binder include a vinylidene fluoride/hexafluoropropylene copolymer, polyvinylidene fluoride (PVDF), polyacrylonitrile, polymethylmethacrylate, polytetrafluoroethylene, mixtures thereof, and a styrene butadiene rubber polymer, but are not limited thereto. Any material available as a binding agent in the art may be used.

Examples of the solvent are N-methyl-pyrrolidone, acetone, and water, but are not limited thereto. Any material available as a solvent in the art may be used.

The amounts of the composite anode active material, the conducting agent, the binder, and the solvent are those levels that are generally used in manufacturing a lithium battery. At least one of the conducting agent, the binder and the solvent may not be used according to the use and the structure of the desired lithium battery.

According to another embodiment, a lithium battery includes an anode including the anode active material. The lithium battery may be manufactured in the following manner.

First, an anode is prepared according to the above-described anode manufacturing method.

Next, a cathode active material, a conducting agent, a binder, and a solvent are mixed to prepare a cathode active material composition. The cathode active material composition is directly coated on a metallic current collector and dried to prepare a cathode plate. Alternatively, the cathode active material composition may be cast on a separate support to form a cathode active material film, which may then be separated from the support and laminated on a metallic current collector to prepare a cathode plate.

The cathode active material may include at least one selected from the group consisting of lithium cobalt oxide, lithium nickel cobalt manganese oxide, lithium nickel cobalt aluminum oxide, lithium iron phosphorous oxide, and lithium manganese oxide. The cathode active material is not limited to these examples, and may be any cathode active material available in the art.

For example, the cathode active material may be a compound represented by one of the following formulae: $Li_aA_{1-b}B_bD_2$ (where $0.90 \leq a \leq 1.8$, and $0 \leq b \leq 0.5$); $Li_aE_{1-b}B_bO_{2-c}D_c$ (where $0.90 \leq a \leq 1.8$, $0 \leq b \leq 0.5$, and $0 \leq c \leq 0.05$); $LiE_{2-b}B_bO_{4-c}D_c$ (where $0 \leq b \leq 0.5$, and $0 \leq c \leq 0.05$); $Li_aNi_{1-b-c}Co_bB_cD_\alpha$ where $0.90 \leq a \leq 1.8$, $0 \leq b \leq 0.5$, $0 \leq c \leq 0.05$, and $0 < \alpha \leq 2$); $Li_aNi_{1-b-c}Co_bB_cO_{2-\alpha}F_{60}$ (where $0.90 \leq a \leq 1.8$, $0 \leq b \leq 0.5$, $0 \leq c \leq 0.05$, and $0 < \alpha < 2$); $Li_aNi_{1-b-c}Co_bB_cO_{2-\alpha}F_2$ (where $0.90 \leq a \leq 1.8$, $0 \leq b \leq 0.5$, $0 \leq c \leq 0.05$, and $0 < \alpha < 2$); $Li_aNi_{1-b-c}Mn_bB_cD_\alpha$ (where $0.90 \leq a \leq 1.8$, $0 \leq b \leq 0.5$, $0 \leq c \leq 0.05$, and $0 < \alpha \leq 2$); $Li_aNi_{1-b-c}Mn_bB_cO_{2-\alpha}F_\alpha$ (where $0.90 \leq a \leq 1.8$, $0 \leq b \leq 0.5$, $0 \leq c \leq 0.05$, and $0 < \alpha < 2$); $Li_aNi_{1-b-c}Mn_bB_cO_{2-\alpha}F_2$ (where $0.90 \leq a \leq 1.8$, $0 \leq b \leq 0.5$, $0 \leq c \leq 0.05$, and $0 < \alpha < 2$); $Li_aNi_bE_cG_dO_2$ (where $0.90 \leq a \leq 1.8$, $0 \leq b \leq 0.9$, $0 \leq c \leq 0.5$, and $0.001 \leq d \leq 0.1$); $Li_aNi_bCo_cMn_dGeO_2$ (where $0.90 \leq a \leq 1.8$, $0 \leq b \leq 0.9$, $0 \leq c \leq 0.5$, $0 \leq d \leq 0.5$, and $0.001 \leq e \leq 0.1$); $Li_aNiG_bO_2$ (where $0.90 \leq a \leq 1.8$, $0.001 \leq b \leq 0.1$); $Li_aCoG_bO_2$ (where $0.90 \leq a \leq 1.8$, $0.001 \leq b \leq 0.1$); $Li_aMnG_bO_2$ (where $0.90 \leq a \leq 1.8$, $0.001 \leq b \leq 0.1$); $Li_aMn_2G_bO_4$ (where $0.90 \leq a \leq 1.8$, $0.001 \leq b \leq 0.1$); $QO_2$; $QS_2$; $LiQS_2$; $V_2O_5$; $LiV_2O_5$; $LiIO_2$; $LiNiVO_4$; $Li_{(3-f)}J_2(PO_4)_3$ ($0 \leq f \leq 2$); $Li_{(3-f)}Fe_2(PO_4)_3$ ($0 \leq f \leq 2$); and $LiFePO_4$.

In the formulae above, A is selected from the group consisting of nickel (Ni), cobalt (Co), manganese (Mn), and combinations thereof; B is selected from the group consisting of aluminum (Al), nickel (Ni), cobalt (Co), manganese (Mn), chromium (Cr), iron (Fe), magnesium (Mg), strontium (Sr), vanadium (V), a rare earth element, and combinations thereof; D is selected from the group consisting of oxygen (O), fluorine (F), sulfur (S), phosphorus (P), and combinations thereof; E is selected from the group consisting of cobalt (Co), manganese (Mn), and combinations thereof; F is selected from the group consisting of fluorine (F), sulfur (S), phosphorus (P), and combinations thereof; G is selected from the group consisting of aluminum (Al), chromium (Cr), manganese (Mn), iron (Fe), magnesium (Mg), lanthanum (La), cerium (Ce), strontium (Sr), vanadium (V), and combinations thereof; Q is selected from the group consisting of titanium (Ti), molybdenum (Mo), manganese (Mn), and combinations thereof; I is selected from the group consisting of chromium (Cr), vanadium (V), iron (Fe), scandium (Sc), yttrium (Y), and combinations thereof; and J is selected from the group consisting of vanadium (V), chromium (Cr), manganese (Mn), cobalt (Co), nickel (Ni), copper (Cu), and combinations thereof.

The compounds listed above as cathode active materials may have a surface coating layer (hereinafter, "coating layer"). Alternatively, a mixture of a compound without a coating layer and a compound having a coating layer, the compounds being selected from the compounds listed above, may be used. The coating layer may include at least one compound of a coating element selected from the group consisting of oxide, hydroxide, oxyhydroxide, oxycarbonate, and hydroxycarbonate of the coating element. The compounds for the coating layer may be amorphous or crystalline. The coating element for the coating layer may be magnesium (Mg), aluminum (Al), cobalt (Co), potassium (K), sodium (Na), calcium (Ca), silicon (Si), titanium (Ti), vanadium (V), tin (Sn), germanium (Ge), gallium (Ga), boron (B), arsenic (As), zirconium (Zr), or mixtures thereof. The coating layer may be formed using any method that does not adversely affect the physical properties of the cathode active material when a compound of the coating element is used. For example, the coating layer may be formed using a spray coating method, a dipping method, or the like. The formation of the coating layer is known in the art and thus a detailed description is not necessary here.

Non-limiting examples of the cathode active material are $LiNiO_2$, $LiCoO_2$, $LiMn_xO_{2x}$ (x=1, 2), $LiNi_{1-x}Mn_xO_2$ (0<x<1), $LiNi_{1-x-y}Co_xMn_yO_2$ (0≤x≤0.5, 0≤y≤0.5), $LiFeO_2$, $V_2O_5$, TiS, and MoS.

The conducting agent, the binder and the solvent used for the cathode active material composition may be the same as those used for the anode active material composition. Alternatively, a plasticizer may be further added into the cathode active material composition and/or the anode active material composition to form pores in the electrode plates.

The amounts of the cathode electrode active material, the conducting agent, the binder, and the solvent are those amounts that are generally used in the manufacture of a lithium battery. At least one of the conducting agent, the binder and the solvent may not be used according to the desired use and structure of the lithium battery.

Next, a separator to be disposed between the cathode and the anode is prepared. The separator may be any separator that is commonly used for lithium batteries. The separator may have a low resistance to the migration of ions in an electrolyte and may have excellent electrolyte-retaining ability. Examples of a separator are glass fiber, polyester, TEFLON, polyethylene, polypropylene, polytetrafluoroethylene (PTFE), and combinations thereof, each of which may be in the form of a non-woven or woven fabric. For example, a rollable separator including polyethylene or polypropylene may be used for a lithium ion battery. A separator with good organic electrolyte solution-retaining ability may be used for a lithium ion polymer battery. As an example, the separator may be manufactured in the following manner.

A polymer resin, a filler, and a solvent may be mixed together to prepare a separator composition. Then, the separator composition may be directly coated on an electrode, and then dried to form the separator. Alternatively, the separator composition may be cast on a support and then dried to form a separator film, which may then be separated from the support and laminated onto an electrode to form the separator.

The polymer resin used to manufacture the separator may be made from any material that is commonly used as a binder for electrode plates. Examples of the polymer resin include a vinylidenefluoride/hexafluoropropylene copolymer, polyvinylidene fluoride (PVDF), polyacrylonitrile, polymethylmethacrylate and mixtures thereof.

Next, an electrolyte is prepared.

As an example, the electrolyte may be an organic electrolyte solution. Alternatively, the electrolyte may be in the solid phase. Non-limiting examples of the electrolyte are lithium oxide and lithium oxynitride. However, any material available as a solid electrolyte in the art may also be used. The solid electrolyte may be formed on the anode by, for example, sputtering.

In some embodiments, an organic electrolyte solution may be prepared as follows. The organic electrolyte solution may be prepared by dissolving a lithium salt in an organic solvent.

The organic solvent may be any solvent available as an organic solvent in the art. Examples of the organic solvent are propylene carbonate, ethylene carbonate, fluoroethylene carbonate, butylene carbonate, dimethyl carbonate, diethyl carbonate, methylethyl carbonate, methylpropyl carbonate, ethylpropyl carbonate, methylisopropyl carbonate, dipropyl carbonate, dibutyl carbonate, benzonitrile, acetonitrile, tetrahydrofuran, 2-methyltetrahydrofuran, γ-butyrolactone, dioxorane, 4-methyldioxorane, N,N-dimethyl formamide, dimethyl acetamide, dimethylsulfoxide, dioxane, 1,2-dimethoxyethane, sulforane, dichloroethane, chlorobenzene, nitrobenzene, diethylene glycol, dimethyl ether, and mixtures thereof.

The lithium salt may be any material available as a lithium salt in the art. For example, the lithium salt may be $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ (where x and y are natural numbers), LiCl, LiI, or a mixture thereof.

Figure 8:
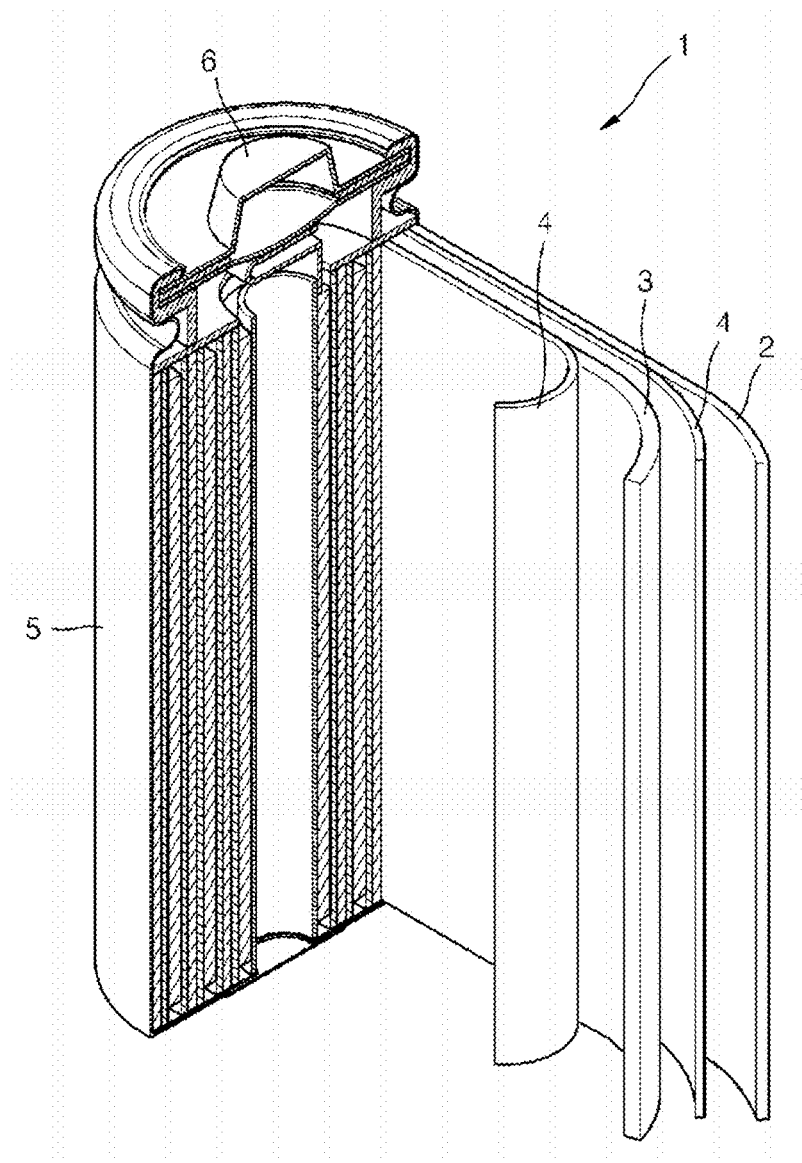
FIG. 8 is a schematic view of a lithium battery according to an embodiment.

Referring to FIG. 8, a lithium battery 1 includes a cathode 3, an anode 2, and a separator 4. The cathode 3, the anode 2 and the separator 4 are wound or folded, and then sealed in a battery case 5. Then, the battery case 5 is filled with an organic electrolyte solution and sealed with a cap assembly 6, thereby completing the manufacture of the lithium battery 1. The battery case 5 may be a cylindrical type, a rectangular type, or a thin-film type. For example, the lithium battery may be a thin-film type battery. The lithium battery may be a lithium ion battery.

The separator may be interposed between the cathode and the anode to form a battery assembly. Alternatively, the battery assembly may be stacked in a bi-cell structure and impregnated with the electrolyte solution. The resulting structure is put into a pouch and hermetically sealed, thereby completing the manufacture of a lithium ion polymer battery.

Alternatively, a plurality of battery assemblies may be stacked to form a battery pack, which may be used in any device that operates at high temperatures and requires high output. Examples include a laptop computer, a smart phone, electric vehicle, and the like.

The lithium battery may exhibit improved high rate characteristics and lifetime characteristics, and thus may be useful in an electric vehicle (EV), for example, in a hybrid vehicle such as plug-in hybrid electric vehicle (PHEV).

According to another embodiment, a method of preparing a composite anode active material includes: preparing a first solution including a pore-forming material, a first metal nanostructure, and a conducting agent; preparing a second solution including a second polymer; electrospinning the first solution and the second solution at the same time to prepare a polymer fiber having a core and shell structure (core/shell structure) including the pore-forming material in the core and the second polymer in the shell; stabilizing the polymer fiber; and calcining the stabilized polymer fiber to obtain the composite anode active material.

In the method, the pore-forming material may be a material that is thermally decomposable at a temperature of less than about 1000° C. For example, the pore-forming material may be a first polymer and/or an inorganic compound.

The pore-forming material may be a first polymer including at least one selected from the group consisting of polystyrene, polymethylmethacrylate, polyvinyl alcohol, polycarbonate, polyester, polyetherimide, polyethylene, polyethyleneoxide, polyurethane, polyvinylacetate, polyvinylchloride, and a copolymer thereof with polyacrylonitrile, but is not limited thereto. Any of various polymers available in the art that are thermally decomposable at a temperature of less than 1000° C. may be used. For example, when these polymers, including polystyrene, polymethylmethacrylate, polyvinyl alcohol, polycarbonate, polyester, polyether imide, polyethylene, polyethylene oxide, polyurethane, polyvinyl acetate, and polyvinylchloride, and a copolymer of polyacrylonitrile are calcined at a temperature of about 1000° C. or less, the thermally decomposable polymers may all be decomposed and removed, while only the polyacrylonitrile component remains to form a porous carbonaceous core.

In some embodiments, the pore-forming material may be at least one inorganic compound selected from the group consisting of silica ($SiO_2$), ammonium carbonate, ammonium bicarbonate, ammonium oxalate, titanium dioxide, and zinc oxide, but is not limited thereto. Any of various inorganic compounds available in the art that may be removed by being dissolved in a solvent or by being chemically etched, not by thermal decomposition, may be used.

In the method, the second polymer may be carbonized to form the shell of a hollow carbon fiber.

In some embodiments, the second polymer may be at least one selected from the group consisting of polyacrylonitrile, polyimide, polyaniline, polypyrrole, and a copolymer of polyacrylonitrile, but is not limited thereto. Any of various polymers that may form a carbon fiber through carbonization at a temperature of about 1000° C. or higher may be used.

The polymer fiber having a core/shell structure may be prepared by electrospinning the first solution and the second solution at the same time through a dual coaxial nozzle. In electrospinning, the first solution and the second solution may be supplied at about 10 μl/min to about 20 μl/min for from about 10 minutes to about 30 minutes, while applying a voltage of 5-10 kV. However, the conditions for electrospinning are not limited thereto, and may be appropriately determined so as to form the polymer fiber having a core/shell structure.

The first metal nanostructure and the conducting agent used in the preparation method may be the same as those of the above-mentioned composite anode active material. For example, in the preparation method, the first metal nanostructure may be silicon nanoparticles, and the conducting agent may be carbon nanotubes.

In the stabilizing of the polymer fiber, the second polymer may be stabilized and modified at a temperature lower than the thermal decomposition temperature of the pore-forming material to have a structure vulnerable to carbonization. For example, in the stabilizing of the polymer fiber, the polymer structure of the polymer fiber may be changed into a structure similar to a benzene ring or to have a cross-linked bond between linear polymers. When the calcining is performed in the absence of stabilizing the polymer fiber, the second polymer may be decomposed, which may result in a failure to obtain a hollow carbon fiber.

The stabilizing of the polymer fiber may be performed in an oxidative atmosphere, for example, in the air or an oxygen atmosphere, at a temperature of about 500° C. or less for about 0.5 hours to about 10 hours. In some embodiments, the stabilizing of the polymer fiber may be performed in an oxidative atmosphere, for example, in the air or an oxygen atmosphere at a temperature of from about 200° C. to about 300° C. for about 0.5 hours to about 10 hours, in some other embodiments, at a temperature of from about 250° C. to about 300° C. for about 0.5 hours to about 10 hours.

The calcining of the stabilized polymer fiber may be performed in an inert atmosphere, including in nitrogen or argon, at a temperature of about 1000° C. or higher for about 0.5 hours to about 10 hours, and in some embodiments, at a temperature of from about 1000° C. to about 1500° C. for about 0.5 hours to about 10 hours.

In the step of calcining, the pore-forming material may be removed by being decomposed, while the second polymer may be carbonized to form the hollow carbon fiber. Through the step of calcining, the core including the first metal nanostructure and the conducting agent disposed in the hollow of the hollow carbon fiber may be formed.

Solvents for the first solution and the second solution may be independently selected from the group consisting of at least one of N,N-dimethylformamide, dimethylsulfoxide, dimethylacetamide, N-methylpyrrolidone, ethylenecarbonate, dimethylfuran (DMF), water, and alcohol, but are not limited thereto. Any of a variety of solvents available in the art may be used.

The solid content of the first solution and the second solution, including the polymer nanostructure, conducting agent, and the like, are not specifically limited, and may be appropriately controlled within a range so as to form a core-shell polymer fiber by electrospinning.

Below, one or more embodiments will be described in detail with reference to the following examples.

However, these examples are not intended to, and should not be construed to, limit the scope of the one or more embodiments.

(Manufacture of an Anode)

EXAMPLE 1

Ten parts by weight of polymethylmethacrylate (PMMA, Aldrich, Lot #MKBG7591V), 2 parts by weight of Si nanoparticles (Aldrich, Lot #MKBD6013V) having an average particle diameter of about 50 nm, and 0.2 parts by weight of carbon nanotubes (Nanocyl, Batch #100419) were added into a mixed solvent of 44 parts by weight of N,N-dimethylformamide, and 44 parts by weight of acetone, and then stirred to prepare a first solution.

Five parts by weight of polyacrylonitrile (PAN, Aldrich, Lot #MKBG4584V) were added into 95 parts by weight of N,N-dimethylformamide, and then stirred to prepare a second solution.

The first solution and the second solution were subjected to electrospinning through a dual coaxial nozzle to draw a polymer fiber having a core/shell structure. In the electrospinning, the first solution and the second solution were supplied at about 1 ml/hr and about 1.5 ml/hr, respectively, while applying a voltage of 10-20 kV. The distance between electrodes was about 10 cm to about 20 cm. An aluminum film was used as the collecting electrode. The spinning nozzle had a diameter of from about 0.1 mm to about 1 mm. The electrospinning was performed at room temperature (the electrospinning operation).

Next, the polymer fiber obtained via the above electrospinning step was stabilized in a hot-air furnace at about 270° C. for about 1 hour while supplying hot air (the stabilization operation).

The stabilized polymer fiber was calcined in a nitrogen atmosphere in a furnace with a temperature increase at a rate of about 2° C./min to about 1,000° C. and then maintained at 1,000° C. for about 1 hour to thermally decompose the pore forming material. After lowering the temperature to room temperature, polyacrylonitrile was carbonized to prepare a composite anode active material (the calcination operation).

The composite anode active material had a porosity of about 50%.

EXAMPLE 2

A composite anode active material was prepared in the same manner as in Example 1, except that Ge nanoparticles having the same particle diameter as the Si nanoparticles were used instead of the Si nanoparticles.

EXAMPLE 3

A composite anode active material was prepared in the same manner as in Example 1, except that carbon nanofibers having the same diameter as the carbon nanotubes were used instead of the carbon nanotubes.

EXAMPLE 4

A composite anode active material was prepared in the same manner as in Example 1, except that Cu nanowires having the same diameter as the carbon nanotubes were used instead of the carbon nanotubes.

COMPARATIVE EXAMPLE 1

A composite anode active material was prepared in the same manner as in Example 1, except that no carbon nanotubes were added.
(Manufacture of Anode and Lithium Battery)

EXAMPLE 5

The composite anode active material powder synthesized in Example 1, carbon black (Denki kagaku) as a conducting agent, and polyvinylidene fluoride (PVDF) as a binder were mixed in an N-methylpyrrolidone solvent to prepare a slurry including the composite anode active material, the conducting agent, and the binder in a weight ratio of about 87:3:10.

The slurry was coated on a 10 μm-thick copper (Cu) foil, dried at about 135° C. for about 3 hours, and then roll-pressed to a thickness of about 70 μm to form an anode plate, which was then used to form a coin cell (CR2016) having a diameter of about 32 nm.

In manufacturing the coin cell, metal lithium as a counter electrode, a polyethylene separator (Star® 20) having a thickness of about 20 μm, and an electrolyte solution of 1.15M $LiPF_6$ dissolved in a mixed solvent of ethylenecarbonate (EC), ethylmethylcarbonate (EMC), and diethylcarbonate (DEC) in a 3:3:4 volume ratio were used.

EXAMPLES 6 TO 8

Lithium batteries were manufactured in the same manner as in Example 1, except that the composite anode active materials of Examples 2 to 4 were used, respectively.

COMPARATIVE EXAMPLE 2

A lithium battery was manufactured in the same manner as in Example 5, except that the composite anode active material of Comparative Example 1 was used.

EVALUATION EXAMPLE 1

SEM, TEM, EDX, and XRD Evaluations

Scanning electron microscopic (SEM) and transmission electron microscopic (TEM) images of the polymer fiber having a core/shell structure prepared through electrospinning in Example 1 are shown in FIGS. 2A to 4.

Figure 3:
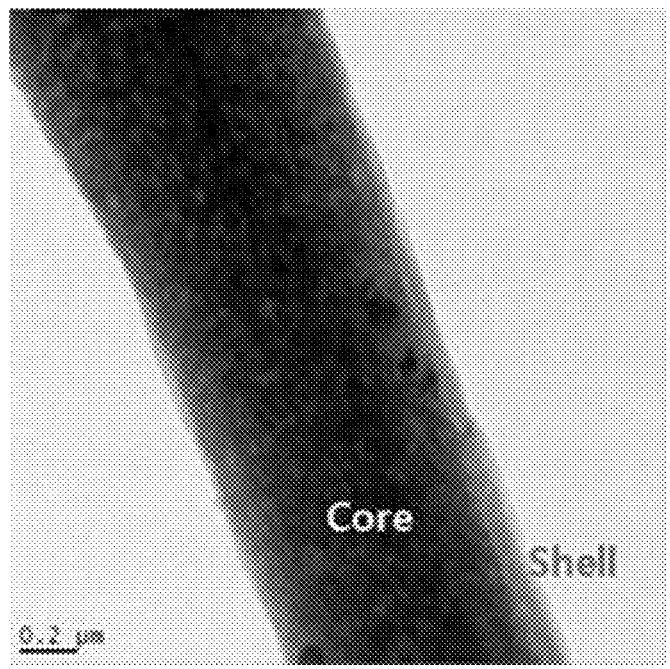
FIG. 3 is a transmission electron microscopic (TEM) image of the polymer fiber having a core/shell structure in Example 1.
Figure 4:
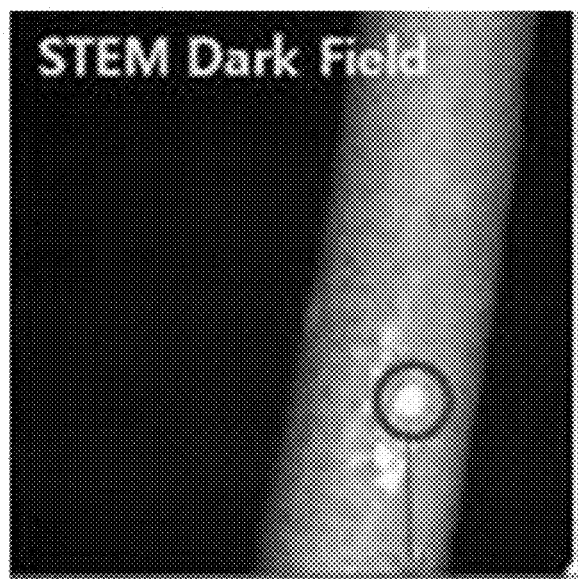
FIG. 4 is a dark-field TEM image of the polymer fiber having a core/shell structure in Example 1.

Referring to FIG. 3, the polymer fiber of Example 1 was found to have a core/shell structure with Si nanoparticles, as seen in the circled region in FIG. 4, in the core. The bright dot in the circled region of FIG. 4 represents silicon.

Figure 5A:
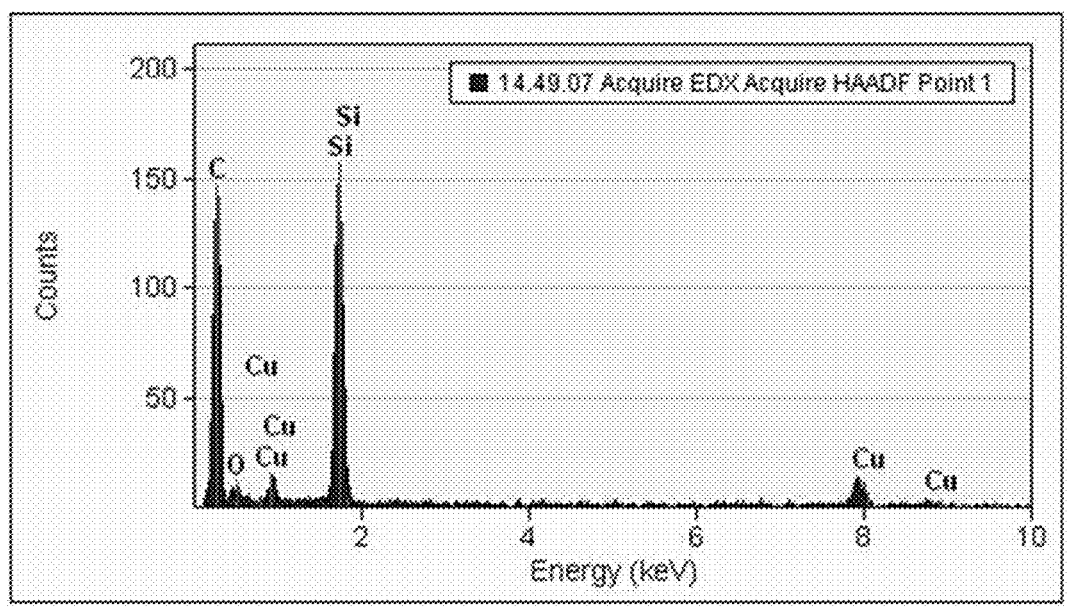
FIG. 5A is an energy dispersive spectroscopy (EDX) spectrum of the polymer fiber having a core/shell structure in Example 1.
Figure 5B:
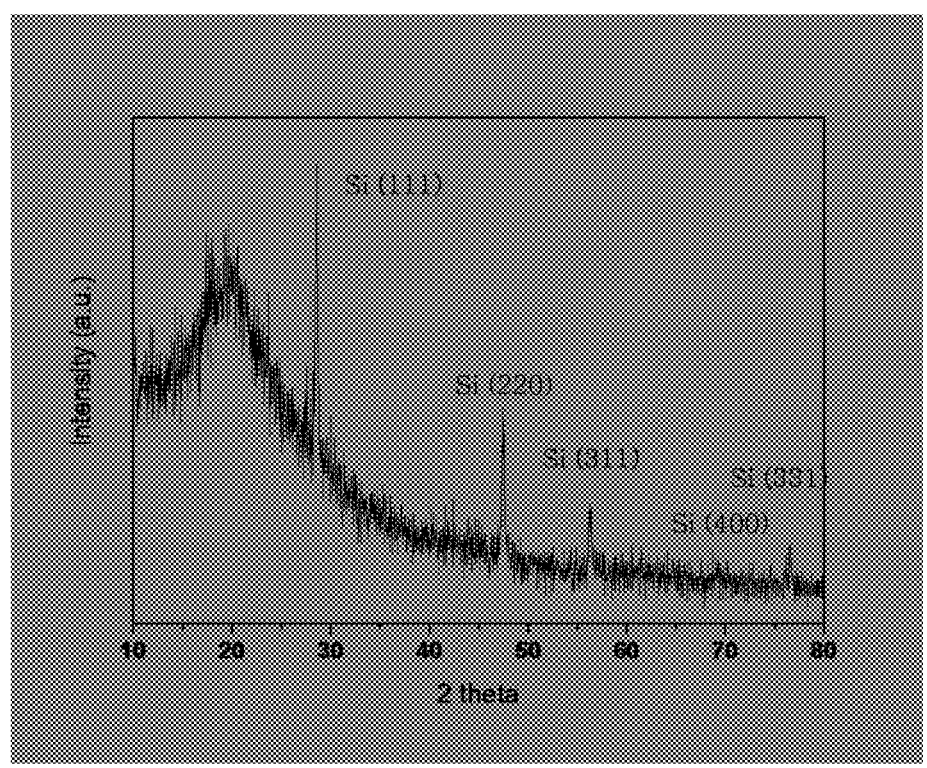
FIG. 5B is an X-ray diffraction (XRD) spectrum of the polymer fiber having a core/shell structure in Example 1.

Energy dispersive spectroscopy (EDX) and X-ray diffraction (XRD) spectra of the polymer fiber of Example 1 are shown in FIGS. 5A and 5B. The polymer fiber of Example 1 was found to include Si nanoparticles, as shown in FIGS. 5A and 5B.

Figure 6A:
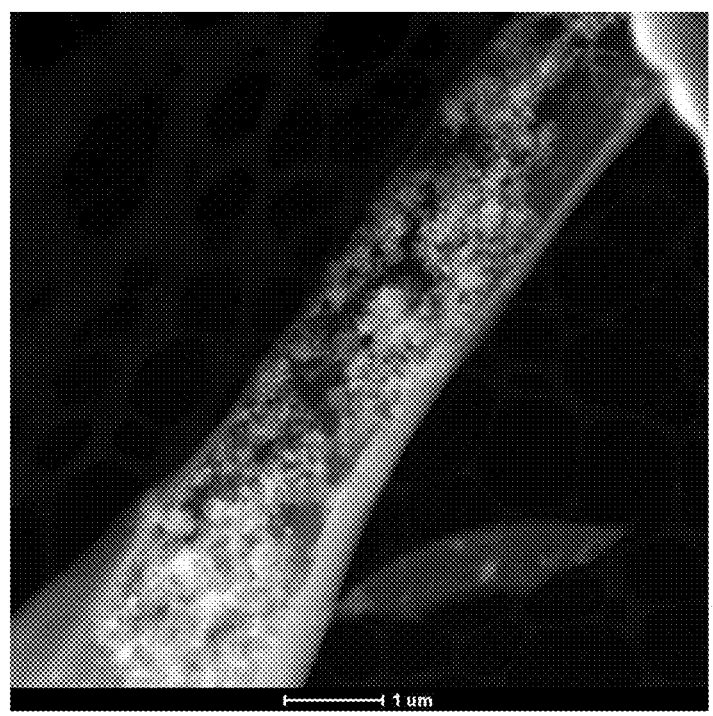
FIG. 6A is a TEM image of a composite anode active material of Example 1.
Figure 6B:
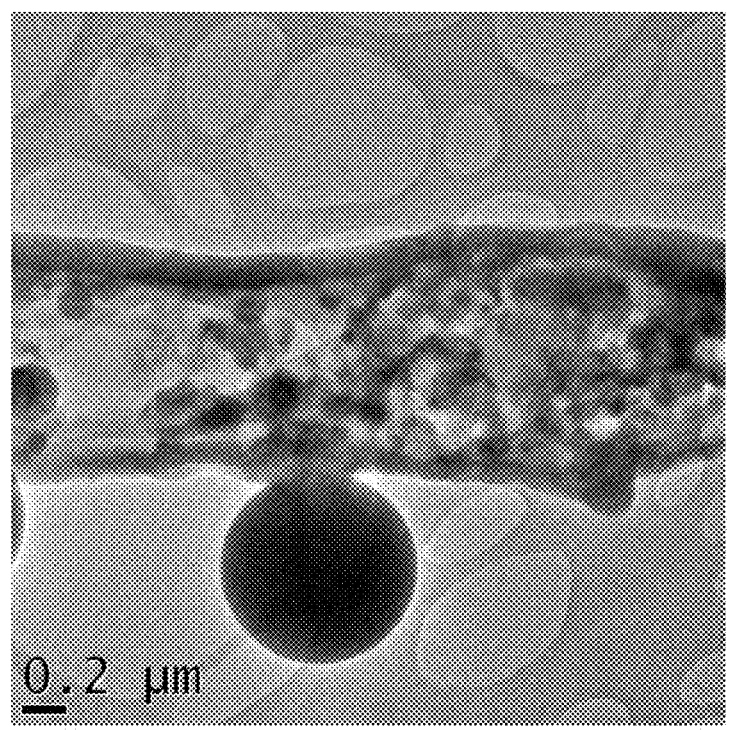
FIG. 6B is a magnified view of FIG. 6A.

TEM images of the final composite anode active material carbonized through calcination are shown in FIGS. 6A and 6B. Referring to FIGS. 6A and 6B, the polymer fiber of Example 1 was found to maintain its fiber shape.

Figure 6C:
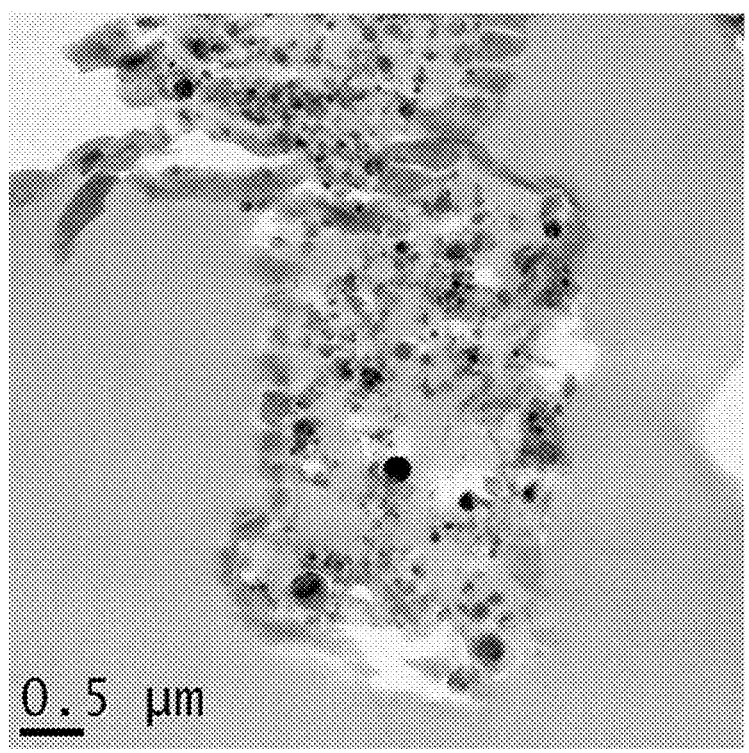
FIG. 6C is a TEM image of a cross-section of the composite anode active material of Example 1.

Referring to FIG. 6C, the composite anode active material of Example 1 was found to include a core coated with a shell of hollow carbon fiber, the core including Si nanoparticles and carbon nanotubes, and a pore formed between the Si nanoparticles and carbon nanotubes. The area of pores in the cross-section of FIG. 6C was about 50% of a total area of the cross-section.

The hollow carbon fiber in FIG. 6B had an outer diameter of about 1.5 μm and a wall thickness of about 200 nm.

EVALUATION EXAMPLE 2

Evaluation of Charge-Discharge Characteristics

The coin cells of Examples 5 to 8 and Comparative Example 2 were each charged with a constant current of 0.2 C at about 25° C. to a voltage of about 0.01V (with respect to Li), and then charged with a constant voltage of about 0.01V to a current of about 0.01 C, followed by discharging with a constant current of 0.2 C to a voltage of 1.5 V (with respect to Li).

Subsequently, each of the cells were charged with a constant current of 0.5 C to a voltage of about 0.01V (with respect to Li), and then charged with a constant voltage of about 0.01 V to a current of 0.01 C, followed by discharging with a constant current of 0.5 C to a voltage of about 1.5V (with respect to Li) (the formation process).

Each of the lithium batteries after the formation process was charged with a constant current of 0.1 C at about 25° C. to a voltage of about 0.01 V (with respect to Li), and then charged with a constant voltage of about 0.01 V to a current of 0.01 C, followed by discharging with a constant current of about 0.1 C to a voltage of about 1.5V (with respect to Li). This cycle of charging and discharging was repeated 100 times.

Figure 7:
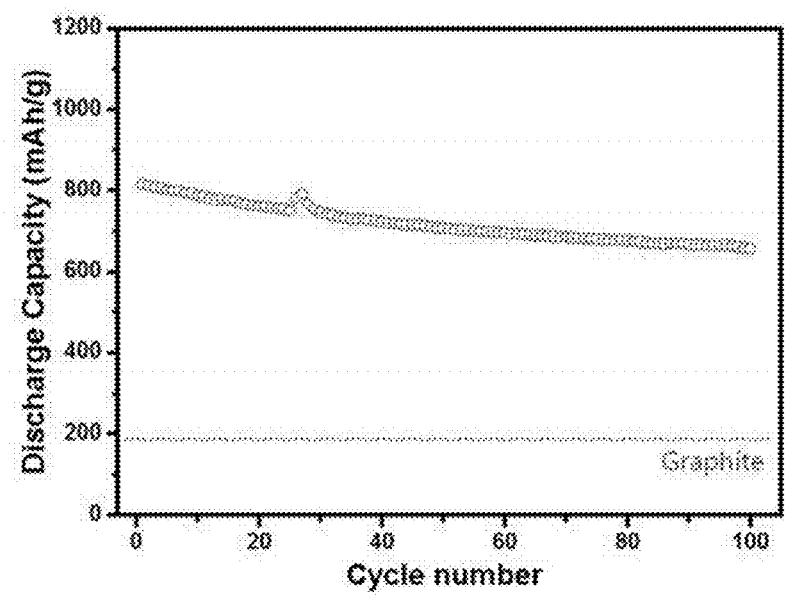
FIG. 7 is a graph illustrating the lifetime characteristics of a lithium battery of Example 5.

The results of the charge-discharge test are shown in FIG. 7.

An estimated capacity of the composite anode active material of Example 1 was calculated from the estimated capacity of each component, according to Equation 1 below. The results are shown in Table 1. Referring to Table 1, the estimated capacity of the composite anode active material of Example 1 was about 850 mAh/g.

Estimated capacity [mAh/g]=[Theoretical capacity of silicon (mAh/g)]×Silicon content+[Theoretical capacity of carbon (mAh/g)]×Carbon content  <Equation 1>

TABLE 1

| Component | Theoretical capacity [mAh/g] | Content [weight fraction] | Estimated capacity [mAh/g] |
|---|---|---|---|
| Silicon | 3,579 | 0.173 | 619 |
| Carbon | 279 | 0.827 | 231 |
| Total | | 1.000 | 850 |

Referring to FIG. 7, the lithium battery of Example 5 manufactured using the composite anode active material of Example 1 was found to have a discharge capacity of about 839 mAh/g at 2nd cycle, which is approximately the estimated theoretical capacity. Due to a stable outer carbon wall and inner pores in the composite anode active material of Example 1, the silicon of the composite anode active material of Example 1 exhibited reversible charging/discharging behaviors to reach a capacity approximate to the theoretical capacity.

The discharge capacity of only silicon in the composite anode material was calculated using Equation 2 below.

Discharge capacity of silicon [m/Ah]={Discharge capacity of the cathode material [mAh/g]− Maximum capacity contribution of carbon [mAh/g]}/Silicon content [wt fraction]  <Equation 2>

The discharge capacity of silicon in the lithium battery of Example 5 was about 3,514 mAh/g with a silicon utilization rate of about 98% with respect to the theoretical capacity.

The silicon unitization ratio of the lithium battery of Example 5 was remarkably improved as compared to the lithium battery of Comparative Example 1, which is equivalent to a lithium battery disclosed as having a silicon utilization rate of about 57.6% in *Nano Lett.* 12, 904, 2012.

EVALUATION EXAMPLE 2

High-Rate Characteristic Evaluation

The coin cells of Examples 5 to 8 were each charged at room temperature with a constant current of 0.2 C, then discharged at varying current densities in a voltage range of 0.01 V to 1.5 V with respect to lithium metal. A change of discharge capacities of some of the lithium batteries, according to an increase in current density during discharging, are shown in Table 2 below. The current densities at which the discharge capacities were measured during discharging were 0.1 C, 0.2 C, 1 C, and 20 C, respectively.

TABLE 2

| | 0.1 C [mAh/g] | 0.2 C [mAh/g] | 1 C [mAh/g] | 20 C [mAh/g] |
|---|---|---|---|---|
| Example 5 | 860 | 836 | 839 | 773 |
| Nano Lett., 12, 802, 2012 | 1,381 | 1,200 | 1,195 | 721 |

Referring to Table 2, the discharge capacity of the lithium battery of Example 5 at 20 C was about 89% of that at 0.1 C. High-rate characteristics of the lithium battery of Example 5 were remarkably increased as compared to the lithium battery disclosed in *Nano Lett.*, 12, 802, 2012, since it shows only about 52.2%.

As described above, according to the one or more of the above embodiments, using an anode active material including both a metal alloyable with lithium and a conducting agent in the hollow of a hollow carbon fiber, a lithium battery may exhibit improved discharge capacity, lifetime characteristics, and high-rate characteristics.

It should be understood that the exemplary embodiments described above should be considered to be descriptive only and do not limit the disclosure. Descriptions of features or aspects within each embodiment should typically be considered as being available for other similar features or aspects in other embodiments.

What is claimed is:

1. A composite anode active material comprising:
   a shell comprising a hollow carbon fiber; and
   a core disposed in a hollow of the hollow carbon fiber,
   wherein the core comprises a first metal nanostructure and a conducting agent,
   wherein the first metal nanostructure is at least one selected from the group consisting of nanoparticle, nanorod, nanowire, nanotube, nanobelt, nanocapsule, and nanotube, and
   wherein the nanoparticle is silicon nanoparticle, germanium nanoparticle, or tin nanoparticle.

2. The composite anode active material of claim 1, wherein the core further comprises a pore.

3. The composite anode active material of claim 1, wherein the composite anode active material has a pore area of from about 10% to about 90% in a short-axial cross-section.

4. The composite anode active material of claim 1, wherein the hollow carbon fiber has an outer diameter of about 500 nm or greater.

5. The composite anode active material of claim 1, wherein the hollow carbon fiber has an outer diameter of from about 500 nm to about 5 μm.

6. The composite anode active material of claim 1, wherein the hollow carbon fiber has a wall thickness of from about 50 nm to about 500 nm.

7. The composite anode active material of claim 1, wherein the first metal nanostructure comprises at least one element selected from the group consisting of silicon, germanium, and tin.

8. The composite anode active material of claim 1, wherein the first metal nanostructure is a nanoparticle and has a diameter of from about 10 nm to about 100 nm.

9. The composite anode active material of claim 1, wherein the conducting agent comprises at least one selected from the group consisting of a carbon nanostructure and a second metal nanostructure.

10. The composite anode active material of claim 9, wherein the conducting agent comprises the carbon nanostructure and the carbon nanostructure comprises at least one selected from the group consisting of carbon nanotube, graphene, carbon nanofiber, fullerene, active carbon particle, carbon nanoplate, carbon onion, and carbon nanoporous.

11. The composite anode active material of claim 9, wherein the conducting agent comprises the second metal nanostructure, and the second metal comprises at least one metal selected from the group consisting of silver, gold, copper, aluminum, calcium, tungsten, zinc, nickel, lithium, iron, platinum, and titanium.

12. The composite anode active material of claim 1, wherein the first metal nanostructure and the conducting agent in the core are in a weight ratio of about 99:1 to about 50:50.

13. An anode comprising a composite anode active material, the composite anode active material comprising:
　a shell comprising a hollow carbon fiber; and
　a core disposed in a hollow of the hollow carbon fiber,
　　wherein the core comprises a first metal nanostructure and a conducting agent,
　　wherein the first metal nanostructure is at least one selected from the group consisting of nanoparticle, nanorod, nanowire, nanotube, nanobelt, nanocapsule, and nanotube, and
　　wherein the nanoparticle is silicon nanoparticle, germanium nanoparticle, or tin nanoparticle.

14. A lithium battery comprising an anode comprising a composite anode active material, the composite anode active material comprising:
　a shell comprising a hollow carbon fiber; and
　a core disposed in a hollow of the hollow carbon fiber,
　　wherein the core comprises a first metal nanostructure and a conducting agent,
　　wherein the first metal nanostructure is at least one selected from the group consisting of nanoparticle, nanorod, nanowire, nanotube, nanobelt, nanocapsule, and nanotube, and
　　wherein the nanoparticle is silicon nanoparticle, germanium nanoparticle, or tin nanoparticle.

15. A method of preparing the composite anode active material of claim 2, the method comprising:
　preparing a first solution comprising a pore-forming material, the first metal nanostructure, and the conducting agent;
　preparing a second solution comprising a second polymer;
　electrospinning the first solution and the second solution at the same time to prepare a polymer fiber comprising a core comprising the pore-forming material and a shell comprising the second polymer;
　stabilizing the polymer fiber to form a stabilized polymer fiber; and
　calcining the stabilized polymer fiber to obtain the composite anode active material.

16. The method of claim 15, wherein the pore-forming material is thermally decomposable at a temperature of less than about 1000° C.

17. The method of claim 15, wherein the pore-forming material is at least one first polymer selected from the group consisting of polystyrene, polymethylmethacrylate, polyvinyl alcohol, polycarbonate, polyester, polyetherimide, polyethylene, polyethyleneoxide, polyurethane, polyvinylacetate, polyvinylchloride, and a copolymer thereof with polyacrylonitrile.

18. The method of claim 15, wherein the pore-forming material comprises at least one selected from the group consisting of $SiO_2$, ammonium carbonate, ammonium bicarbonate, ammonium oxalate, titanium dioxide, and zinc oxide.

19. The method of claim 15, wherein, in the calcining, the second polymer is carbonized to form a hollow carbon fiber.

20. The method of claim 15, wherein the second polymer comprises at least one selected from the group consisting of polyacrylonitrile, polyimide, polyaniline, polypyrrole, and a copolymer of polyacrylonitrile.

21. The composite anode active material of claim 9, wherein the conducting agent comprises the second metal nanostructure, and the second metal comprises at least one metal selected from the group consisting of silver, gold, copper, aluminum, calcium, tungsten, zinc, nickel, iron, platinum, and titanium.

* * * * *